United States Patent [19]
Keller et al.

[11] 3,758,707
[45] Sept. 11, 1973

[54] METHOD FOR OBTAINING ELECTRONIC COLOR CORRECTION SIGNALS

[76] Inventors: Hans Keller, 23 Kiel, Flensburger Strasse 23; Hans-Georg Knop, Am 2323 Ascheberg, Horn 22, Germany

[22] Filed: Dec. 27, 1971

[21] Appl. No.: 212,182

Related U.S. Application Data
[63] Continuation-in-part of Ser. No. 847,970, Aug. 6, 1969, abandoned.

[30] Foreign Application Priority Data
Aug. 8, 1968 Germany............. P 17 97 049.9

[52] U.S. Cl. .............................................. 178/5.2 A
[51] Int. Cl. ............................................... H04n 1/46
[58] Field of Search ................................... 178/5.2 A

[56] References Cited
UNITED STATES PATENTS
| | | | |
|---|---|---|---|
| 3,600,505 | 8/1971 | Dobouney | 178/5.2 A |
| 2,949,499 | 8/1960 | Zeyen et al. | 178/5.2 A |
| 3,324,235 | 6/1967 | Kyte | 178/5.2 A |

Primary Examiner—Robert L. Griffin
Assistant Examiner—George G. Stellar
Attorney—Carlton Hill, J. Arthur Gross and John D. Simpson et al.

[57] ABSTRACT

A method for obtaining electronic color correction signals in which the differences with respect to compensative masking (elimination of the gray tones) are formed between the amplitudes of the logarithmic or trichromatic color measurement signals non-linearly transformed. These difference signals are split by selection according to their sign into primary partial signals from each two of which a further signal may be formed and divided into secondary partial signals according to actual sign. An emphasis of primary and/or secondary partial signals is provided wherein the signals are emphasized more strongly in definite areas of the color space than in other color areas of the region of the color space encompassed by the partial signals. Relative emphasis is effected only over a relatively limited area within the color scale extending from a neutral (non-chomatic) color to a saturated chromatic color selectively by transforming the partial signals in accordance with a non-linear function. The same partial signal may be transformed in accordance with two different functions, for example, a logarithmic and a negative linear function, and the difference signal is formed from the two resulting transformation signals. The signals are then employed to control color amplifying channels in the color correction process.

14 Claims, 11 Drawing Figures

Patented Sept. 11, 1973

INVENTORS
Hans Keller
Hans-Georg Knop

BY ATTORNEYS

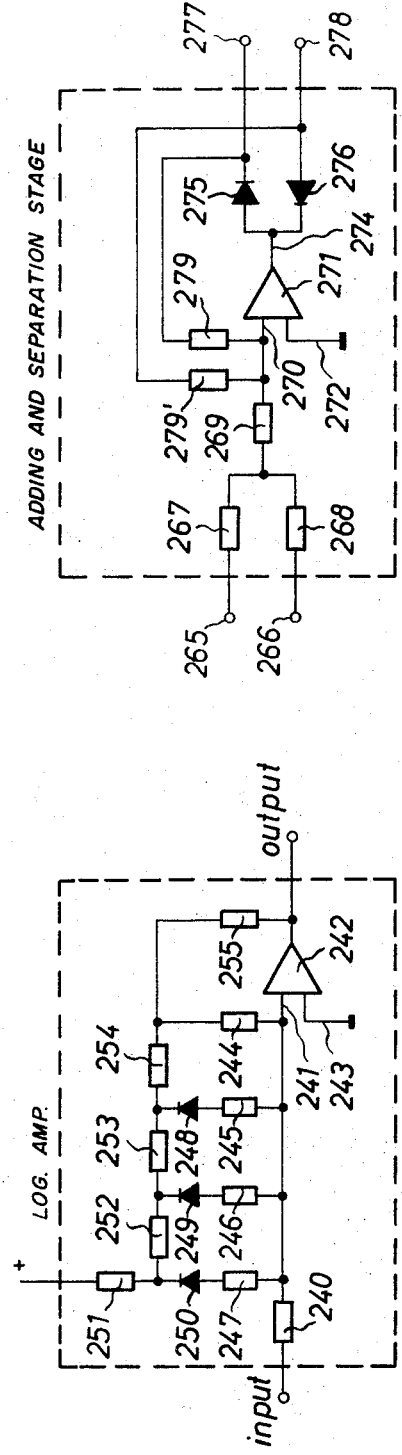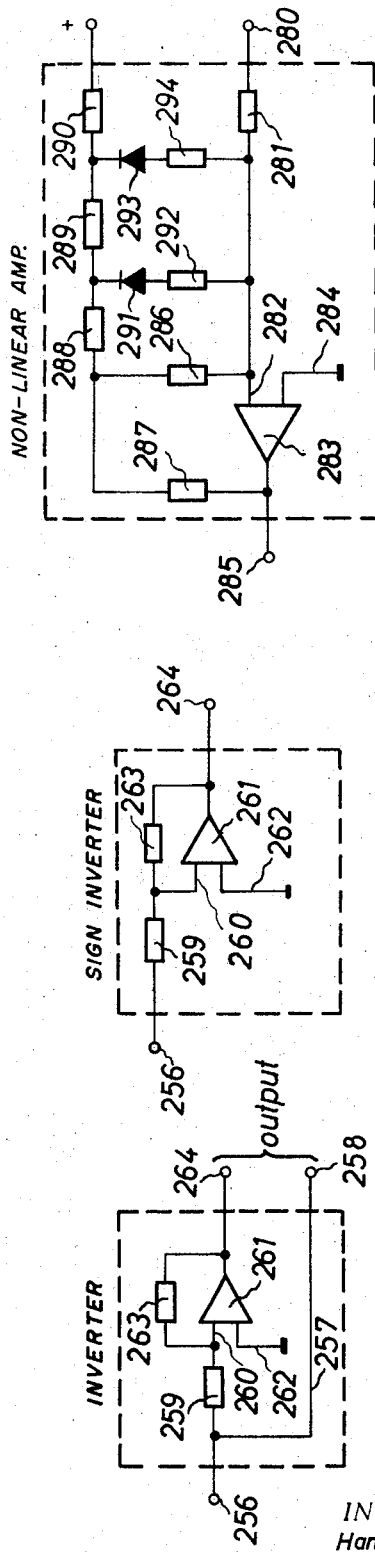

METHOD FOR OBTAINING ELECTRONIC COLOR CORRECTION SIGNALS

CROSS REFERENCE TO RELATED APPLICATIONS

This application is a continuation-in-part of our previous application of the same title, Ser. No. 847,970, filed Aug. 6, 1969, now abandoned.

BACKGROUND OF THE INVENTION

1. Field of the Invention

This invention relates to a method for obtaining color correction signals, and more particularly to the realization of color correction signals which are effective to provided fidelity in the reproduction of "skin colors," brown and several light pure colors.

2. Description of the Prior Art

In color printing most color correction computers, so-called color scanners, color correction techniques work on the basis of trichromatic color measurement values obtained through color filters, which measurement values, in the space of Cartesian coordinates form the group of all the colors, a color space of irregular shape. Associated therewith a cubic color space of the color dosage values, utilized for color printing. The mathematical combination which converts the space of the trichromatic color measurement values into that of a color dosage value is the color correction calculation. The first step is usually a non-linear distortion, generally meaning a logarithmic or a part-logarithmic evaluation of the color measurement values according to said distortion and the color space is shown as a small irregular rhombus which has surfaces of different inclination, curvature and size. Correction signals, then, are derived from the transformed trichromatic signals to which the correction signals are then again added, addition and subtraction of signals having the character of a linear transformation of the color space. Thereby, however, residual errors remain which have to be eliminated by altering the method of calculation or by additional calculation. The correction signals are effective in accordance with a previous method over a large area of the color space.

In accordance with modern methods, color correction signals become more and more specific in that they are required to be effective only on one part of the color space. It is known to obtain the difference from two trichromatic signals, in which difference no signal for a neutral tone is contained. This signal has already been submitted to linear distortion. It is further known to split this primary difference signal according to sign into a positive and negative partial signal and to use varying amounts of the partial signals for correction. Accordingly, this means that the color space is divided into two halves which are corrected independently of one another. However, even in the best case each two dial colors of the color space are commonly corrected.

According to the latest known method, by forming a secondary difference signal from two of the above-named primary difference signals, or from one of the primary difference signals and a trichromatic signal, likewise according to a sign division, specific correction signals are obtained for a signal dial color. It is known also to submit such a signal for the purpose of contrast adjustment to a simple non-linear transformation, before it comes into use as a correction signal. By utilizing such correction values, calculation of the ideal color dosage space can be carried out successfully from the color measurement value space. In spite of the above techniques, however, there are still defects. The color correction values always have a very monotonously constant, mostly linear curve in the area of operation. The signals are oriented therein with reference to the usual control method, in order to correct preferably control colors, more particularly the six chromatic dial colors (3 print colors and their 3 mixtures of the first order) and the gray tone. The correction of the intermediate colors of the color space is no less important, sometimes it is even especially important. This concerns particularly the "skin colors" brown and several light pure colors.

SUMMARY OF THE INVENTION

According to the invention, techniques are provided to obtain correction signals for special correction of intermediate colors and according thereto, the primary and/or the secondary partial signals are submitted before their further utilization to an emphasis, the signals being emphasized more strongly in definite areas of the color space than in other color areas of the region of the color spacing encompassed by the partial signals.

Since the relative emphasis is to be effected only over a relatively limited area within the color scale extending from a neutral (non-chromatic) color to a saturated chromatic color, that is to say selectively in these ranges, the emphasis is effected advantageously by transforming the partial signals in accordance with a non-linear function.

The possible achievement of a definite maximum color correction comprises, in particular, the provision of a transformation of the same partial signal with two different functions, preferably a logarithmic and a negative linear function, and the difference is formed from the two resulting transformation signals.

BRIEF DESCRIPTION OF THE DRAWINGS

Other objects, features and advantages of the invention, its organization, construction and operation will best be understood by reference to the following detailed description, taken in conjunction with the accompanying drawings, in which:

FIG. 4 is a schematic circuit diagram of a logarithmic amplifier;

FIG. 5 is a schematic circuit diagram of an inverter circuit;

FIG. 6 is a schematic circuit diagram of an addition and separation circuit for adding and then separating the positive and negative portions of the sum signal;

FIG. 7 is a schematic diagram of a sign inverter;

FIG. 8 is a schematic circuit diagram of a non-linear amplifier;

DESCRIPTION OF THE PREFERRED EMBODIMENTS

The color components contained in the actual color measurement value signals are referenced herein and on the drawings by lower case letters where *wh* means white, *bl* black, *rd* red, *gn* green, *ye* yellow, *cy* cyan, *mg* magenta and *vi* violet.

Figure 1:
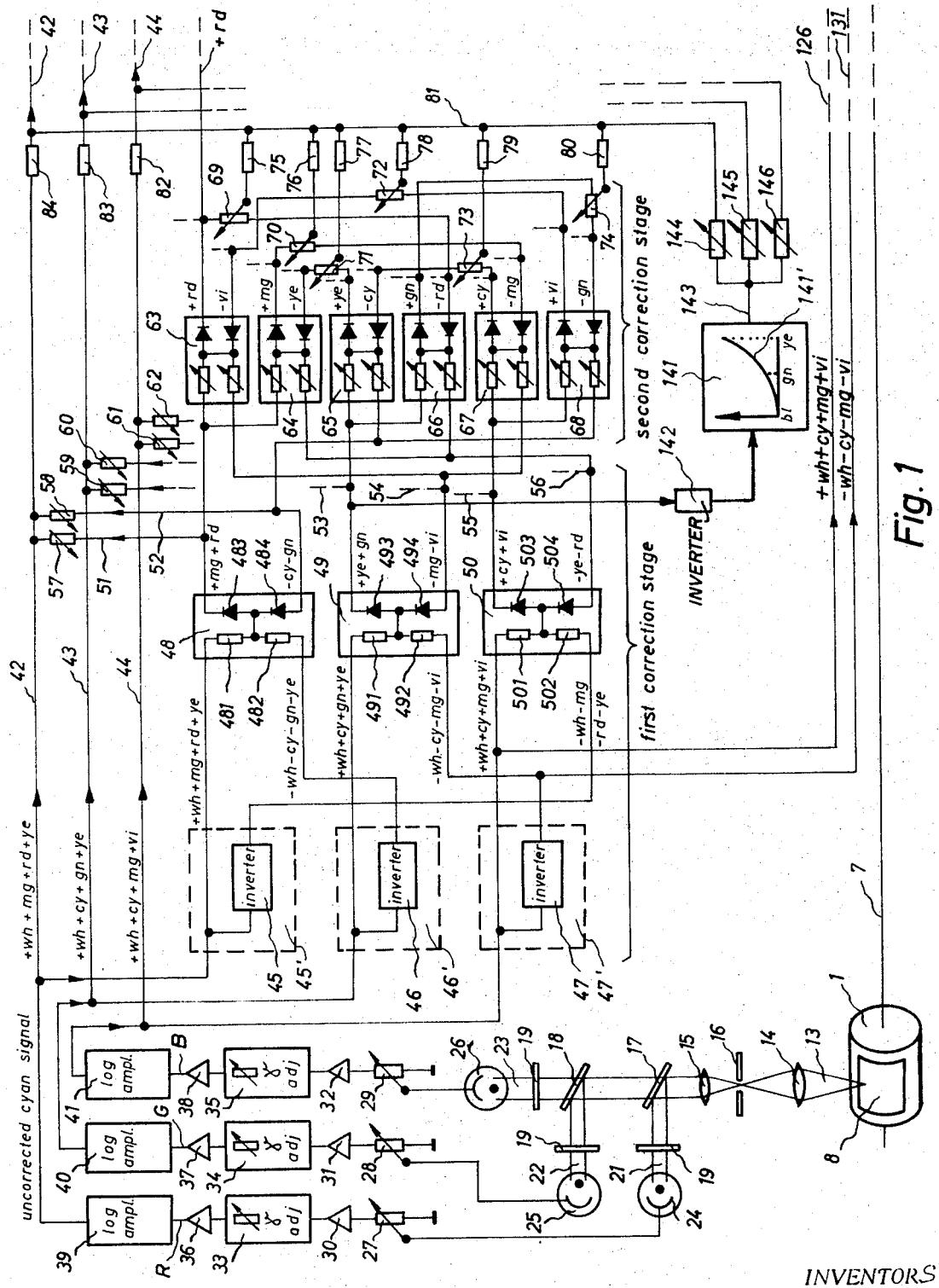
FIGS. 1 and 2 together form a schematic circuit diagram of an embodiment of a color scanner for color correction over several electronic stages connected between the points of scanning and recording.
Figure 2:
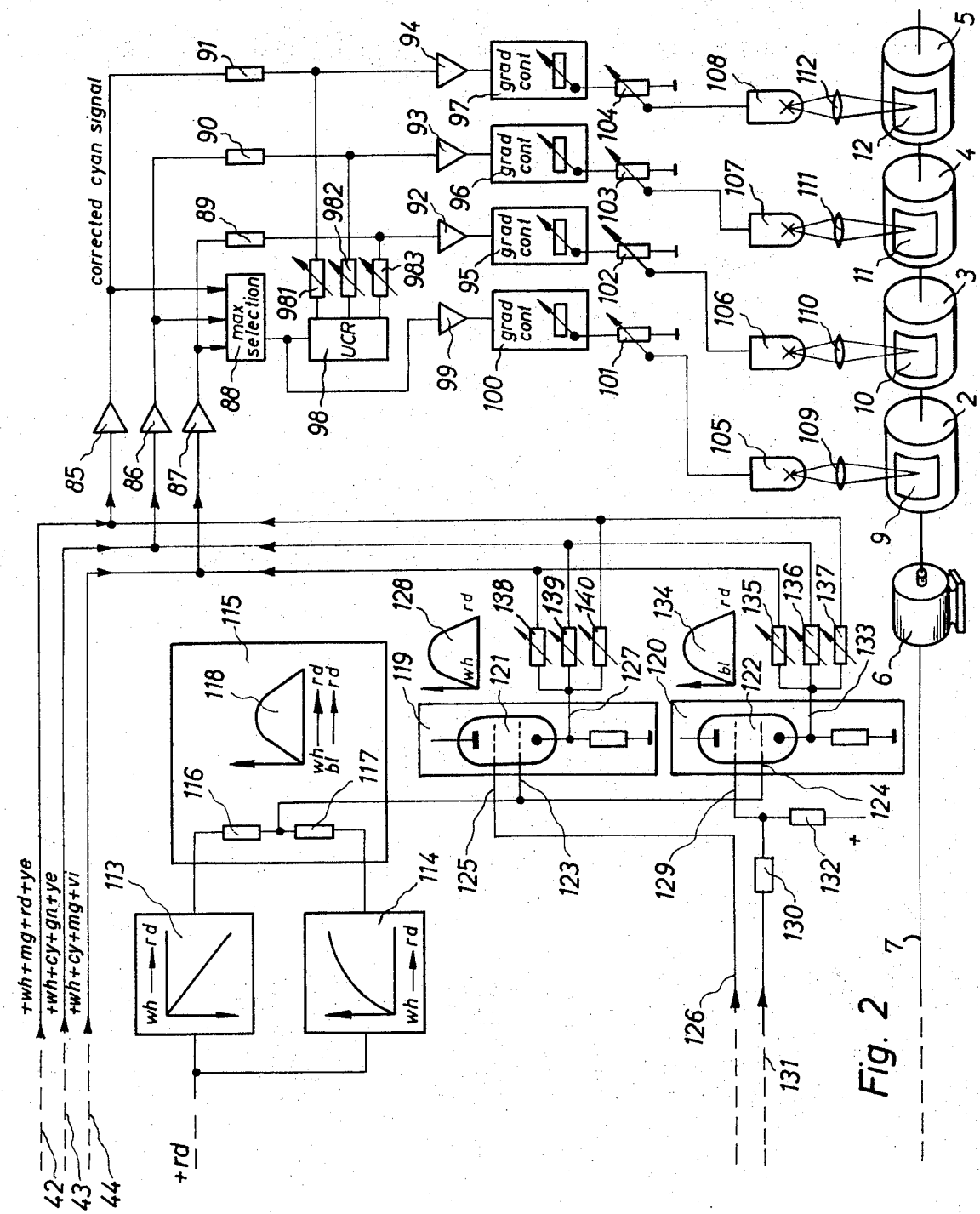

In FIGS. 1 and 2, a plurality of rotating drums 1, 2, 3, 4 and 5 are synchronously driven by a motor 6 via a schematically illustrated shaft 7. The drum 1 carries a colored image pattern 8 which is electrooptically scanned and reproduced as color separation 9, 10, 11 and 12 on the recording drums 2, 3, 4 and 5, respectively. When the image pattern 8 is scanned, the passed or reflected light of a light beam 13 is focussed by means of lenses 14 and 15 and passed on through an aperture 16. The focussed light beam 13 is trichromatically split by means of interference filters 17, 18 and 19, or by means of correspondingly colored glass filters, to become three light beams 21, 22 and 23. The trichromatically split beams 21, 22 and 23 are received by respective photo tubes 24, 25 and 26 to develop the corresponding color separation signals which are adjustable by means of potentiometers 27, 28 and 29 in order to supply respective preamplifiers 30, 31 and 32 with equal input voltage levels. Gamma correction stages 33, 34 and 35, linear logarithmic distortion amplifiers 36, 37 and 38 and distortion stages 39, 40 and 41 are serially provided for each of the pre-amplifiers 30, 31 and 32. The uncorrected primary color separation signals at the outputs of the logarithmic amplifiers 36, 37 and 38 are proportional to the density of the colored image patterns and are sumbitted to a first color correction. For this purpose, the primary color separation signals are processed via lines 42, 43 and 44 to stages 45', 46' and 47' which include respective inverters 45, 46 and 47, and to the addition and separation stages 48, 49 and 50. The lines 42–44 represent different channels.

The addition and separation stage 48 includes an adding circuit comprising a pair of resistors 481 and 482 and a rectifier circuit including a pair of diodes 483 and 484. The adding and separation stages 49 and 50 contain similar structure and have corresponding reference numerals. A positive primary color separation signal of one color and a negative, i.e., inverter signal, of another color are added each time in the addition and separation stages 48, 49 and 50 in order to obtain first difference signals. These first difference signals are divided, according to their sign, into two correction signals. Each one of these correction signals represents only two dial colors (basic colors). The white and gray portions are completely removed. These difference signals, i.e., the first color correction signals are extended toward the uncorrected color separation signals for carrying out a first correction by way of lines 51, 52, 53, 54, 55 and 56 and respective adjustable resistors 57, 58, 59, 60, 61 and 62. The strength of this correction can be adjusted independently for each correction signal and for each polarity by the resistors 57–62. In order to be able to carry out a second and more particular color correction, pairs of the first difference signals which appear at the outputs of the addition and separation stages 48, 49 and 50 are selected in such a way that they have signal components which represent the same dial (basic) colors mentioned above, but with different signs. These selected signals are applied to a second group of addition and separation stages as 63, 64, 65, 66, 67 and 68, which are the same in structure as the stages 48–50 but including adjustable resistors, and in which the amplitude relationship can be adjusted by the adjustable resistors so that the signals, although appearing with different polarities, will have the same amplitude. Due to the opposite polarity of the signal components, one dial (basic) color of the two signals will be eliminated. The remaining signal, which still contains two dial (basic) colors is separated into two signals, corresponding to the sign of its amplitudes. After the latter separation, each of the signals represents only one dial (basic) color and thus forms the second color correction signals.

The second color correction process for only one primary color separation signal for the separation signal of the red filter, cyan *cy*, is illustrated in FIGS. 1 and 2. For the second color correction, pairs of the same dial (basic) color, but with different signs, are selected and applied to the first corrected signals by way of the potentiometers 69–74 and the resistors 75–80, for example, via a line 81. The amount of correction can be adjusted by way of the potentiometers 69–74 to allow correction of each one of the six dial (basic) colors.

The resistors 82–84 are provided for decoupling the two color correction stages.

After the second color correction, the twice corrected signals are applied to a plurality of amplifiers 85, 86 and 87, and processed toward a black-selecting or separation stage 88 for selecting the maximum signal. This maximum signal among the color separation signals is represented by the black separation signal which is provided to a color returning or under-color removal stage 98 from where it is applied to a gradation stage 100 by way of an amplifier 99. The black separation signal is applied to the corrected color separation signals via adjustable resistors 981, 982 and 983 in order to reduce the contents of the colors in the black and gray tones. The resulting color separation signals are non-linearly distorted or reshaped in the gradation stages 95, 96, 97 and 100 in order to adapt the signals to the particularities of the recording system, i.e., the particularities of the printed shapes and the photo material.

The amplitudes of the reshaped signals are adjusted according to the desired intensity values by way of respective potentiometers 101, 102, 103 and 104. The recording lamps 105, 106, 107 and 108 are controlled by these signals and produce the desired color separations on the photo sensitive photo material 9, 10, 11 and 12 by way of corresponding optical focussing systems 109, 110, 111 and 112.

In order to obtain a correction possiblity for the so-called skin colors, such as brown, light red and some lighter or fairly light colors, which should be independent from the above described correction of the six dial (basic) colors of the color range, the positive partial signal corresponding to red + *rd* is taken from an output of the addition and separation stage 63 (FIG. 1) for application linearly through the values from zero through saturation in a linear stage 113. The emphasis of this signal, which is suggested according to this invention, is obtained by means of non-linear distortion. For this purpose, a superposition of a linear function and a non-linear function, which by itself is not suitable, is effected which results in a non-linear distortion. The positive linear connection between signal amplitude and color correction degree is inverted in the stage 113, i.e., is rendered negatively linear. The signal which is supplied to the stage 113 is simultaneously applied to a stage 114 in which it experiences a logarithmic distortion. A summation signal is obtained from the output signals of the stages 113 and 114 in a stage 115 by way of resistors 116 and 117 and, due to the negative sign of the output signal of the stage 113, the summation signal represents the difference of the two signals. If, in addition, precautions are taken for rendering the output voltages of the stages 113 and 114 for the saturated colors equally large, the curved path 118 occurs as illustrated in the stage 115, i.e., a curve which has the value zero with white wh or black bl and with saturated red rd and which has a maximum for certain intermediate colors. By means of a selection of the applied conversion possibilities or, respectively, their coefficients and constants, it can be provided that this maximum lies about a particularly selected intermediate color.

The above described circuit, however, does not operate as unambiguously as desired since the intermediate values for the colors white wh through red rd are light red colors and the intermediate values from black bl through red rd represent brown tones. In order to select only the light red, the brown color may be corrected, or both colors can be corrected to different degrees. The output signal of the stage 115 is simultaneously applied to two different amplifier stages 119 and 120. Only one of these amplifier stages is open when white wh colors occur and only the other stage opens when primarily black bl colors occur. The amplifiers 119 and 120 are realized by two double grid tubes 121 and 122 and one of their control grids 123 and 124, respectively, is loaded with the output signal of the stage 115.

The second grid 125 of the tube 121 is loaded by way of a line 126 with a positive white +wh voltage occurring at the output of the stage 47' (FIG. 1). The tube 121 is therefor only controlled when fairly light colors occur, i.e., when high voltages are present at its grid 125, and it remains blocked for black bl colors. Therefore, only signals for light red colors, in particular flesh colors, will occur at the output 127 of the tube 121 as indicated graphically by the curve 128 adjacent the amplifier 119.

The second control grid 129 of the tube 122 is loaded with a negative white −wh signal from the stage 47' by way of a resistor 130 and a line 131 and is positively based by way of a resistor 132. The bias is compensated by high negative white −wh signals or even over compensated so that the tube 122 is blocked for colors close to white wh. However, the tube 122 is controlled or treated into conduction with colors close to black bl, since the positive bias prevails toward such operation. Therefore, particular signals for the brown colors occur at the output 133 of the tube 122, as can be seen from the curve 134 by graphically illustrated adjacent the amplifier 120. The voltage at the output 133 of the tube 122 of the amplifier 120, as well as the voltage at the output of the tube 121 of the amplifier 119 is applied to the main channels comprising the lines 42, 43 and 44 by way of a plurality of adjustable resistors 135, 136, 137 or 138 139 and 140, respectively, for correcting the twice corrected colors according to, for example, flesh tones.

However, on the other hand, it can also happen that a saturated color is supposed to be corrected without permitting the correction to have an effect on the intermediate colors. For this reason, a further correcting stage 141 (FIG. 1) is provided to obtain a signal having the negative yellow −ye and negative green −gn from the stage 49 by way of an inverter 142. The original linear voltage curve black bl to yellow ye is distorted according to the path of a curve with increasing slope as illustrated in the correction stage 141. This distortion is obtained in one or several diodes which are operated in the bent portion of their characteristic curve. One of the two signal components minus green −gn and minus yellow −ye, the component minus green −gn representing an intermediate value and thus being essentially smaller than the component minus yellow −ye, is more or less completely suppressed, depending on the position and shape of the curve, or rather the component minus yellow −ye is strongly emphasized. Therefore, a particular correction signal for the saturated yellow ye will appear at the output 143 of the stage 141 and applied to the main channels (lines 42, 43 and 44) by way of adjustable resistors 144, 145 and 146.

Figure 3:
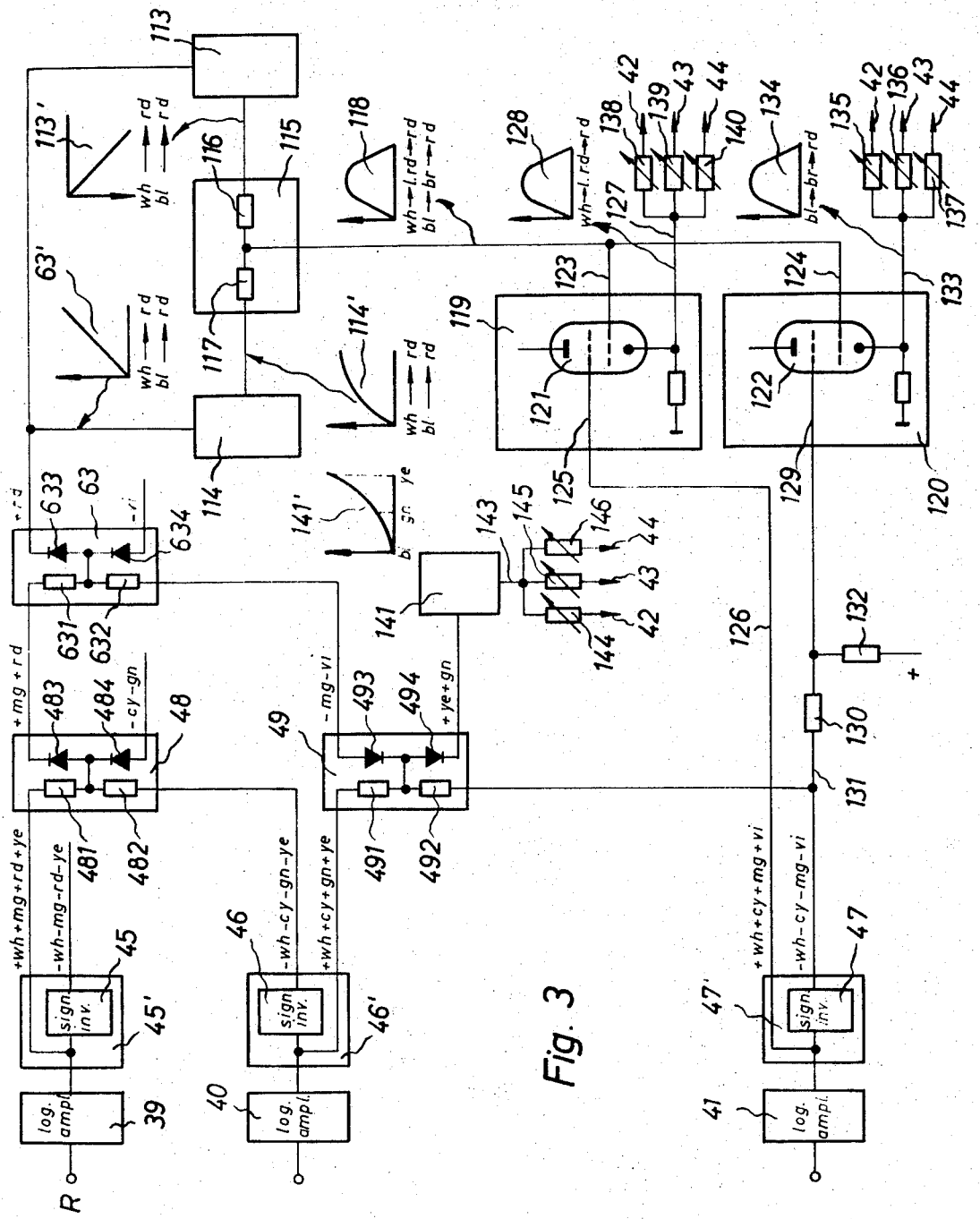
FIG. 3 is a schematic circuit diagram of a simplified color correction circuit with respect to that illustrated in FIGS. 1 and 2.

In FIG. 3, another embodiment of the invention has been illustrated in which the correction of the bright red colors, the brown colors and the saturated yellow is effected with, in principle, the same correction stages as in FIGS. 1 and 2. However, the individual stages which were required with the preceding example for the separation and correction of the six colors, have been eliminated. Furthermore, in order to simplify matters, the scanning drum, the beam separation apparatus, the level adaptation apparatus and the gamma correction apparatus for obtaining the uncorrected primary color separation signals have been omitted on the scanning side. On the recording side, the black separation stage, the color return or removal circuits, the gradation control and the recording circuits and recording drums have not been illustrated although these equipments are also utilized with the apparatus specifically illustrated in FIG. 3.

The electrical color separation signals which are obtained behind the separation filters arrive at the terminals R, G and B. The terminals R, G and B have also been indicated in FIG. 1 in order to point out where the electrical color separation signals are correspondingly provided. The color separation signals are then logarithmatized in the manner illustrated in FIG. 1 in the stages 39, 40 and 41, or converted according to a similar non-linear function such as a so-called semi-logarithmatizing function, and are separated according to their sign, or with alternating voltages according to their phase position, in the stages 45', 46' and 47' by the respective inverters 45, 46 and 47, and are further processed on separate channels. The further application of these signals has been illustrated only for one of these channels for purpose of simplicity and clarity. The color portions which are contained in the respective signals are recorded at the outputs of the stages. In the stages 48 and 49 two of the signals, respectively with opposite signs are added by way of the resistors 481, 482 or 491 and 492 and separated according to their signs by means of the diodes 483 and 484 or 493 and 494. These signals are the first difference signals and respectively are contained only to remnant color components. In FIG. 1 these have been illustrated as positive magenta $+mg$, positive red $+rd$, and negative cyan $-cy$, negative green $-gn$, and negative magenta $-mg$, negative violet $-vi$ and positive yellow $+ye$, positive green $+gn$. In the stage 63, the signal containing the negative magenta and violet componets $-mg$, $-vi$, which occurs at the output of the stage 49 is added to the signal containing the positive magenta and positive red $+mg$, $+rd$ which is provided by the stage 48, by way of the resistors 631 and 632. Due to the opposite signs of the positive and negative magenta color portions $+mg$, $-mg$, the magenta color portion is eliminated and, after the sign separation provided by the diodes 633 and 634, the signals of positive red $+rd$ and negative violet $-vi$ are obtained as the second difference signals or secondary partial signals. In the example according to FIG. 3, only the further treatment of the positive red $+rd$ difference signal is specifically illustrated.

As it has been indicated above, the positive red $+rd$ difference signal can be extended through to the saturated color, whereby the signal voltage starting from the value zero increases linearly toward the value of saturation.

The emphasis which is suggested according to the present invention is now obtained by a non-linear distortion of this linear relationship.

A suitable non-linear distortion can also be provided by means of superimposing a linear function with a non-linear function which, as mentioned above, is not suitable by itself. This is accomplished in the stages 113, 114 and 115. In the stage 113, the positive linear relationship between signal amplitude and color saturation degree is inverted, i.e., rendered negatively linear, as indicated by the graphical representation 113'.

The positive red $+rd$ signal which is applied to the stage 113 is simultaneously applied to the stage 114 where it experiences a logarithmic distortion, as graphically indicated at 114'. The output signals of the stages 113 and 114 are added in the stage 115, i.e., the difference is formed over the resistors 116 and 117 due to the negative signal of the stage 113. If, in addition, provisions are made that these output signals are equally large for the saturated color, and thus results in the difference of zero, the voltage curve 118 will result, namely a curve which has the values zero with white $wh$ (or black $bl$) and with saturated red $rd$, and which has a maximum for certain intermediate color tones. By means of a suitable selection of the conversion functions, or rather their coefficients and constants, it can be provided that this maximum lies at the particular desired intermediate values.

The circuit described thus far, however, still operates ambiguously since the intermediate values for the color line white $wh$ through red $rd$ are light red colors and the intermediate values for the color line black $bl$ through red $rd$ are brown colors. In order to obtain that selectively only the light red $rd$ or the brown colors or both colors can be corrected to different degrees, the output signal of stage 115 is simultaneously applied to two different amplifier channels, one of which is opened only when colors appear which are close to white $wh$ and the other only when colors appear which are close to black $bl$.

The amplifier channels 119 and 120 are realized by the two double grid tubes 121 and 122, whereby the first control grid 123 of the tube 121 is loaded with the output voltage of the stage 115. The second grid 125 of the tube 121 is loaded by way of the line 126 with a positive white signal $+wh$ which occurs at the output of the stage 47'. This tube is therefore only triggered when light colors occur, when high positive voltage is applied to its second control grid 125, while it remains blocked for signals close to black $bl$. Therefore, only signals for light red $rd$ colors, in particular flesh colors, can occur at the output 127 of the tube 121, as is indicated graphically by the curve 128. These signals are applied toward the main channels 42, 43 and 44 by way of the resistors 138, 139 and 140 for carrying out the correction as in FIG. 2. The first control grid 124 of the tube 122 is loaded with the output voltage of the stage 115. The second control grid 129 of the tube 122 is loaded by way of the line 131 and a resistor 130 with a negative white $-wh$ signal, and is positively biased by way of the resistor 132. The bias is compensated or even over-compensated by high negative white $-wh$ signals so that the tube 122 is blocked for colors close to white $wh$. With colors close to black $bl$, however, the tube 122 is triggered into conduction due to the prevailing positive bias. Therefore, particular signals for brown colors occur at the output 133 of the tube 122 as can be seen from the graphical illustration at 134. The correction is effected as in FIG. 2 via the resistors 135, 136 and 137 on the main channels 42, 43 and 44.

On the other hand, it can also happen that a saturated color is suppose to be corrected, but without having an effect on the intermediate color values. Such a correction signal is obtained in the stage 141 from the primary positive yellow and green $+ye$, $+gn$ signal which is taken from the addition and separation stage 49. In the correction stage 141, the originally linear voltage curve black $bl$ through yellow $ye$ is distorted according to the curve 141' so as to have increasing slope. This distortion is effected in a manner which is common through the use of one or several diodes which operate in the bent portions of their characteristic curves. The positive green $+gn$ color portion of the two signal portions, which is an intermediate value and thus essentially smaller than the positive yellow $+ye$ portion is strongly emphasized with respect to the yellow $ye$. Therefore, a special correcting signal for the saturated yellow $ye$ appears at the output 143 of the stage 141 and applied toward the main channels 42, 43 and 44 by way of the adjustable resistors 144, 145 and 146.

FIG. 4 illustrates a circuit of a logarithmic amplifier as may be utilized for the stages 39, 40 and 41 when the circuit construction is to be realized for direct voltage signals. The input of the amplifier reaches a first input 241 of an operational amplifier 242 by way of a resistor 240 and the second input 243 of the operational amplifier 242 is grounded. The input 241, a plurality of resistors 244–247 and a plurality of diodes 248–250 are connected to a voltage divider circuit comprising a plurality of resistors 251–254 which is connected between a positive pole of a voltage source and the resistor 244. A resistor 255 is connected to the output of the amplifier 242 and to the resistor 244. By means of selecting the resistors to determine the operational points of the diodes 248, 249 and 250, the curve path of a logarithmic function can be approximated according to whose characteristic the logarithmic amplifiers are to operate. In order to obtain more accuracy, the number of diodes and the corresponding resistors can be increased.

If the signals which are to be processed are not to be direct voltage signals but direct voltage signals which are modulated onto an alternate frequency carrier, a circuit can advantageously be provided such as described in U.S. Pat. application Ser. No. 99,011, filed Dec. 17, 1970 in FIG. 5.

Figure 9:
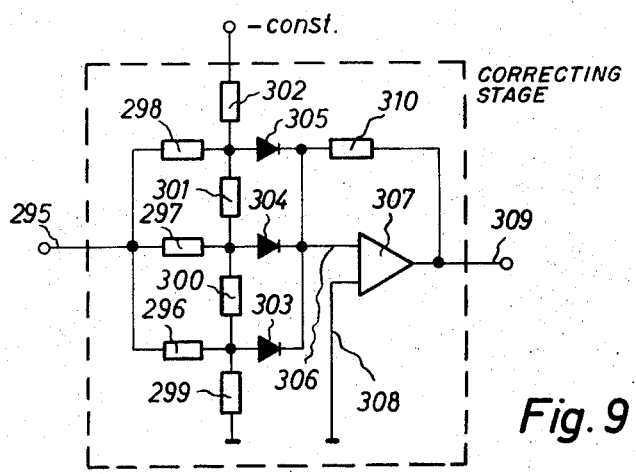
FIG. 9 is a schematic circuit diagram of a correcting stage which may be utilized in practicing the present invention.

FIG. 5 illustrates a circuit according to which the stages 45', 46' and 47' may be constructed. This circuit is an inverter circuit which, at its output, provides a signal having a positive sign and the same signal having a negative sign. The input signal at the input 256 is connected directly to an output 258 without sign inversion by way of a line 257, and by way of a resistor 259, an input 260 of an operational amplifier 261 whose other input 262 is grounded. The input 260 is connected with the output 264 by way of a resistor 263 and a signal will be provided at the output 264 whose sign is opposite to that of the input signal and therefore opposite to that of the output signal at the output 258. This circuit is suitable for direct voltage signals. However, if alternate voltage signals are to be utilized, in the form of signals which are modulated onto a carrier, a circuit may be applied as it is illustrated in FIG. 9 of the aforementioned U. S. Pat. application 99,011, filed Dec. 17, 1970.

FIG. 6 illustrates a further circuit which permits realization of the stages 48, 49 and 50, as well as the stage 63. The inputs 265 and 266 are connected to a resistor 269 by way of respective resistors 267 and 268. The resistor 269 is connected to an input 270 of an operational amplifier. The resistors 267 and 268 correspond to the resistors 481 and 482, 491 and 492, 501 and 502, and 631 and 632 of FIGS. 1, 2 and 3. The other input 272 of the operational amplifier 271 is connected to ground. Two diodes 275 and 276 connect the output of the amplifier 271 to respective outputs 277 and 278, the diodes 275 and 276 being connected in an antiparallel relationship. The input 270 of the amplifier 271 is coupled back from the outputs 277 and 278 by way of respective resistors 279 and 279'. A similar circuit for adding and separating direct current signals is illustrated in FIG. 6 of the aforementioned U. S. Pat. application Ser. No. 99,011, filed Dec. 17, 1970. A corresponding circuit for the case wherein alternate voltage signals are utilized can also be applied in an advantageous manner as illustrated in FIG. 7 of this prior application.

FIG. 7 illustrates a sign inverter which comprises an operational amplifier circuit including an amplifier 261 having an input 262 connected to ground and an input 260 connected to an input terminal 256 by way of a resistor 259. The input 260 is also connected to the output of the amplifier 261 by way of a resistor 263, an output terminal for the circuit being provided by means of the terminal 264. This inverter circuit may be utilized for realizing the sign inverter circuits such as 45, 46, 47.

FIG. 8 illustrates a circuit similar to FIG. 4 which may be employed in realizing the stage 114. The signal which is applied to the input 280 reaches the input 282 of an operational amplifier 283 by way of a resistor 281. The other input 284 of the operational amplifier 283 is connected to ground. A resistor 286 connects the output 285 to the input 282 by way of a resistor 287. A voltage divider comprising a plurality of resistors 288, 289 and 290 is connected from the connection point of the resistors 286 and 287 to a positive pole of a voltage source. The connection points between the resistors 288 and 289 as well as between the resistors 289 and 290 are respectively connected with the input 282 of the amplifier 283 via a series connection of a diode 291 and a resistor 292, and a diode 293 and a resistor 294, respectively. Depending on the selection of the resistors of this network, the desired functions can be approximated by the diodes.

In FIG. 9, a circuit has been illustrated for performing the function 141' of the stage 141 of FIGS. 1 and 3. By way of a plurality of resistors 296, 297 and 298, an input 295 is connected to a voltage divider comprising a plurality of resistors 299, 300, 301 and 302 which are connected between ground and a constant negative voltage. The voltage divider is connected with an input 306 of an operational amplifier 307 by way of a plurality of diodes 303, 304 and 305. The other input 308 of the operational amplifier 307 is connected to ground. The output 309 of the operational amplifier 307 is connected to the input 306 by way of a resistor 310. The diodes 303–305 are blocked in response to low signals due to the negative voltage applied by way of the voltage divider. The more positive the input signal becomes, the more will be passed by the diodes. The passage characteristic of this network corresponds to the passage curve of the stage 141 in FIGS. 1 and 3, that is by the curve 141'.

Figure 10:
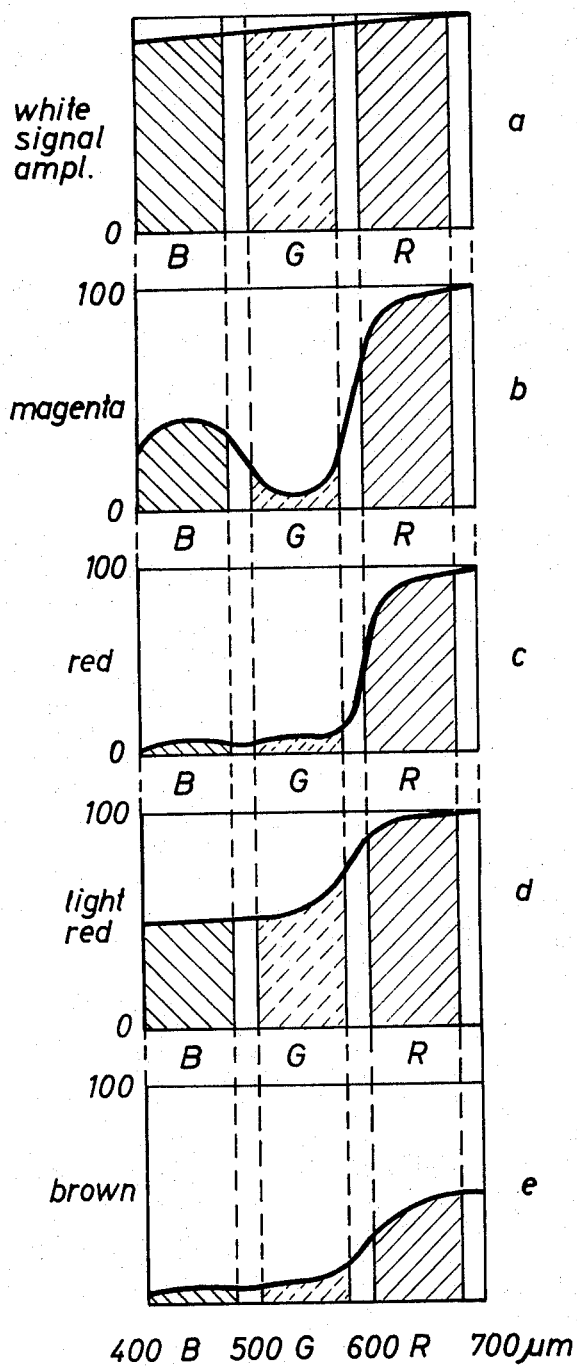
FIG. 10 is a graphical illustration of the amplitude path of the logarithmic cover separation signals.

In order to clearly express with this invention which colors or signal amplitudes in the spectrum ranges, respectively, are meant by the color terms applied herein such as white $wh$, magenta $mg$, red $rd$, light red or brown, the amplitude path of the logarithmized signals of these colors is illustrated in FIG. 10, while depending on the wave lengths 400 $\mu$m through 700 $\mu$m. In FIG. 10 the letters R, G and B state the spectrum ranges of the red, blue and green filters. From the above, it can clearly be seen that, a side of the filter ranges characteristic to the individual colors, signal amplitudes occur in other filter ranges with these individual colors which must not be neglected and which, among other things, are the reason for the required color corrections.

Figure 11:
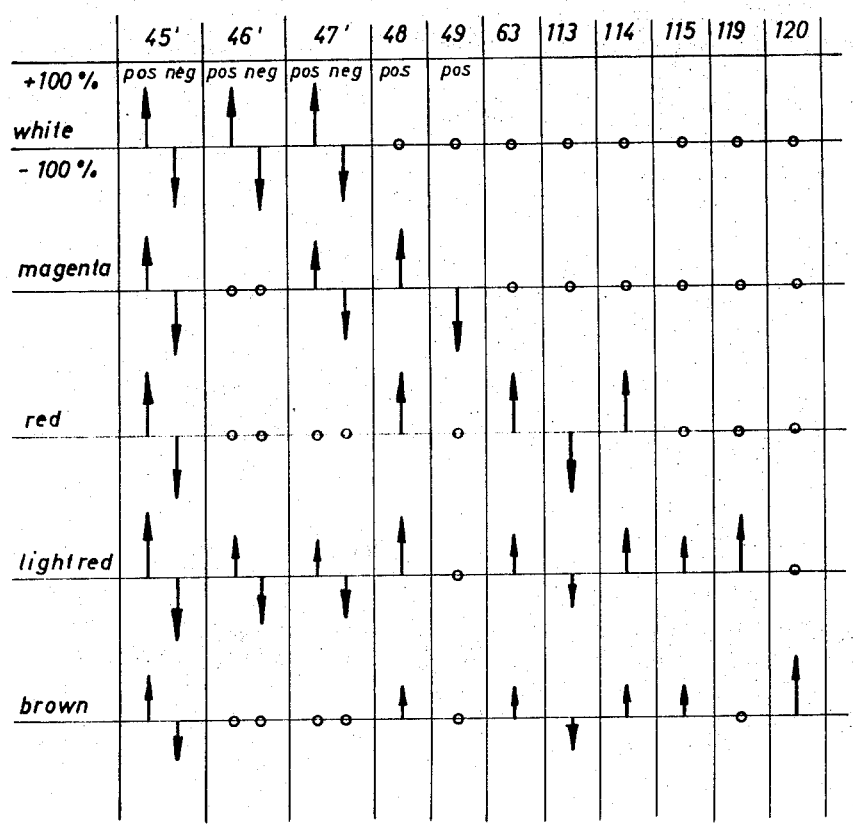
FIG. 11 is a schematic representation of the output signals of the individual stages of FIGS. 1, 2 and 3.

The signal amplitude for white $wh$ is adjusted for all channels to 100 percent with such a color correction device which results in a clear assignment of all signal magnitudes which are obtained for the colors. The output signals for the colors occurring have schematically been illustrated as arrows in FIG. 11 for the individual stages of the circuit arrangement of FIGS. 1, 2 and 3, which arrows are respectively separated for the positive and negative polarities. The reference numerals 45', 46', 47', 48, 49, 63, 113, 114, 115, 119 and 120 in the upper line of FIG. 11 indicate the outputs of the like-numbered stages of FIGS. 1, 2 and 3. The signal arrows under these reference numerals indicate the signal magnitude for the respective color pattern. Therefore, it can be recognized that the signal white $wh$ at the positive output of the stage 48 has already been compensated to the value zero, whiel the signals for magenta $mg$ and red $rd$ occur fully since they are not present as negative signals and the output of the stage 46'. A correspondingly smaller signal of the stage 48 occurs for the color light red from the addition of the positive output of the stage 45' to the negative output of the stage 46'. The signal representing brown also occurs in the stage 48 with about half the amplitude. If the signal of the stage 49 is added to the signal of the stage 48 the signal is compensated to zero in the stage 63, while red, light red and brown remain constant. In the stage 114, the portions of light red and brown are increased relatively with respect to the signal for red $rd$, but not in the stage 113 light red and brown remain constant in the stage 115, while red $rd$ is compensated to zero. The remaining partial signals can now be amplified and, as described above, be applied to the main channels 42, 43 and 44 of FIGS. 1 and 2 for a correction by way of the amplifiers 119 and 120.

Although we have described our invention by reference to specific illustrations, many changes and modifications of our invention may become apparent to those skilled in the art without departing from the spirit and scope of our invention. It is therefore to be understood that we intend to include within the patent warranted hereon all such changes and modifications as may reasonably and properly be included within the scope of our contribution to the art.

What we claim is:

1. In a method for obtaining electronic color correction signals including generating color measurement signals, transforming the color measurement signals in a non-linear fashion and dividing the transformed signals according to sign, combining the divided signals and dividing again according to sign into primary partial signals, and combining the primary partial signals and dividing according to sign into secondary partial signals, the improvement in the method comprising further transforming the partial secondary signals by selectively emphasizing those signals in definite areas of color space more strongly than those signals in other areas of the color space encompassed by the secondary partial signals in accordance with a transfer function which is emphasized between a nonchromatic color and a chromatic color.

2. In the method according to claim 1, wherein said further transformation of the partial secondary signals is further defined as comprising the step of emphasizing said signals with the emphasis lying at a saturated color in accordance with a selected non-linear function.

3. In a method according to claim 2, wherein the further transformation of the partial secondary signals comprises non-linearly emphasizing signals lying in the intermediate values of the color scales extending from white to a saturated color.

4. In a method according to claim 2, wherein the further transformation of the partial secondary signals comprises non-linearly emphasizing signals lying in the intermediate values of the color scales extending from black to a saturated color.

5. In a method according to claim 1, wherein the further transformation of the partial secondary signals comprises the step of emphasizing the partial signals in accordance with a predetermined non-linear function.

6. In a method according to claim 5, wherein the non-linear emphasis is provided with the emphasis lying in a saturated color.

7. In a method according to claim 1, wherein the further transformation of the partial secondary signals includes transforming a partial signal in accordance with a logarithmic function, transforming the same partial signal in accordance with a negatively linear function, and providing the difference between the two transformed signals.

8. In a method according to claim 7, wherein the further transformation of the partial secondary signals includes providing that the difference between the two transformed signals is zero for predetermined colors.

9. In a method according to claim 8, wherein the further transformation of the partial secondary signals further includes feeding the difference signal to two different channels which correspond to the terminals of the color space area encompassed by the secondary partial signals, and controlling the opening and closing of the channels in accordance with the magnitude of the difference.

10. In a method according to claim 9, comprising the further steps of deriving an additional primary partial signal from a color measurement signal and providing the additional partial signal to each of the channels to aid in the opening and closing thereof.

11. In a method according to claim 7, wherein the further transformation of the partial secondary signals includes emphasizing those signals which lie intermediate the ends of the color space area encompassed by the secondary partial signals.

12. In a method according to claim 11, wherein the further transformation of the partial secondary signals includes providing that the difference between the two transformed signals is zero for predetermined colors.

13. In a method according to claim 11, where the further transformation of the partial secondary signals further includes feeding the difference signal to two different channels which correspond to the terminals of the color space area encompassed by the secondary partial signals, and controlling the opening and closing of the channels in accordance with the magnitude of the difference.

14. In a method according to claim 13, comprising the further step of providing an additional partial signal to each of the channels to aid in the opening and closing thereof.

* * * * *